Patented Jan. 9, 1940

2,186,115

UNITED STATES PATENT OFFICE 2,186,115

FILLER MATERIAL FOR WELDING

Arthur R. Lytle, Niagara Falls, N. Y., assignor to Oxweld Acetylene Company, a corporation of West Virginia No Drawing. Application May 7, 1938, Serial No. 206,531

2 Claims. (Cl. 75—155)

This invention relates to filler material for welding, brazing, or soldering, and especially to such material in the form of a rod.

Ordinary brass of the type containing about 60% copper and 40% zinc is an inexpensive material that can be used for welding, brazing, or soldering, but such uses are restricted in some fields by the relatively high melting point of the material (about 880° C.) and by its property of emitting zinc fumes when melted.

According to the present invention, the above disadvantages of brass weld filler material are overcome by including 1% to 6% cadmium and 0.01% to 0.5% silicon in a material containing 62% to 47% copper and the remainder substantially zinc, the zinc content being at least 20%. Silver may be added in an amount up to about 10%. Preferably, the cadmium content is between 2% and 4%, and the silver, when present, is between 2% and 6%. Small amounts of other and incidental materials, such as tin, iron, and manganese, may also be included without substantially altering the character of the material, but it is preferred that the total amount of such additional materials be not over 2%.

Compositions of the weld filler material of this invention that have been successfully used in the form of welding rods in the brazing of malleable iron and other metals contain, for example:

| Rod No. | Composition (remainder zinc) | | | | |
|---|---|---|---|---|---|
| | Percent Cu | Percent Cd | Percent Si | Percent Ag | Percent Sn |
| 1 | 62.52 | 2.78 | 0.06 | None | None |
| 2 | 51.2 | 2.5 | 0.05 | None | None |
| 3 | 54.8 | 2.05 | 0.16 | 4.98 | 1.06 |

I claim:
1. Weld filler material containing approximately 62% to 47% copper, 1% to 6% cadmium, 0.01% to 0.5% silicon, remainder zinc.
2. Weld filler material containing substantially 62% to 47% copper, 2% to 4% cadmium, 0.01% to 0.5% silicon, remainder zinc.

ARTHUR R. LYTLE.